United States Patent [19]
Gleim et al.

[11] Patent Number: 5,375,107
[45] Date of Patent: Dec. 20, 1994

[54] TRACK ERROR CONTROL SIGNAL GENERATION APPARATUS AS FOR A DISC PLAYER

[75] Inventors: Günter Gleim; Friedrich Füldner; Bernd Rekla, all of VS-Villingen-Schwenningen, Germany

[73] Assignee: Deutsche Thomson-Brandt GmbH, Villengen-Schwenningen, Germany

[21] Appl. No.: 871,444

[22] Filed: Apr. 21, 1992

[51] Int. Cl.[5] .................................. G11B 7/00
[52] U.S. Cl. .......................... 369/44.11; 369/44.41
[58] Field of Search ............ 369/44.11, 124, 54, 369/44.32, 44.35, 44.25, 47, 32, 58, 44.26, 44.29, 44.35, 44.41, 44.36; 360/27, 77.02, 46; 307/517, 234, 351, 273

[56] References Cited

U.S. PATENT DOCUMENTS

| | | | |
|---|---|---|---|
| 4,406,000 | 9/1983 | Shoji et al. | 369/44.35 |
| 4,587,644 | 5/1986 | Fujiie | 369/44.25 |
| 4,651,234 | 3/1987 | Bauer | 360/46 |
| 4,748,610 | 5/1988 | Nakata et al. | 369/44.25 |
| 4,935,912 | 6/1990 | Hirano et al. | 369/44.11 |
| 5,034,940 | 7/1991 | Saito et al. | 369/44.36 |
| 5,151,888 | 9/1992 | Shickichi et al. | 369/44.25 |
| 5,164,933 | 11/1992 | Matsueda | 369/54 |

OTHER PUBLICATIONS

Kumagai, "Optical Disc Device" Patent Abstracts of Japan vol. 9, No. 127, (P-350) [1850], May 31, 1985, pp. J03 P 360.

Nakagawa, "Optical Disc Device" Patent Abstracts of Japan vol. 9, No. 127 (P-350) [1850], May 31, 1985, pp. J03 P 360.

Matsuno, "Object Lens Driving Device", Patent Abstracts of Japan vol. 9, No. 127, (P-350) [1850], May 31, 1985, pp. J03 P 360.

*Primary Examiner*—Aristotelis Psitos
*Assistant Examiner*—Nabil Hindi
*Attorney, Agent, or Firm*—Joseph S. Tripoli; Eric P. Herrmann; Ronald H. Kurdyla

[57] ABSTRACT

A regulation circuit which guides a laser beam along the data track of a recording medium includes a first comparator which receives an HF signal and a first threshold signal. The HF signal is normally high and goes low when the laser scans a dirty or damaged area of the recording medium. The first comparator provides a first output signal when the HF signal is less than the first threshold signal. A second comparator receives a tracking error signal and a second threshold signal. The tracking error signal is normally low and goes high when the laser leaves the data track. The second comparator provides a second output signal when the tracking error signal is high and exceeds the second threshold signal. The first and second output signals are input to an AND gate which provides a signal indicating that the laser beam has left the data track when the first and second output signals are both high.

1 Claim, 5 Drawing Sheets

$FE = (AS+CS)-(BS+DS)=0$
$TE = ES-FS > 0$

TRACK ERROR CONTROL SIGNAL GENERATION APPARATUS AS FOR A DISC PLAYER

This is a continuation of PCT application PCT/EP 90/01595 filed Sep. 20, 1990 by Gunter Gleim, Friedrich Fuldner, and Bernd Rekla and titled "Detector Circuit".

This invention can be used with the invention described in U.S. Pat. No. 5,327,410 by Gunter Gleim, Friedrich Fuldner and Bernd Rekla and titled "Direction-Determination Logic", which application is a continuation of PCT application PCT/EP 90//01594, filed Sep. 20, 1990

This invention can be used with the invention described in U.S. Ser. No. 871,442 filed Apr. 21, 1992, now U.S. Pat. No. 5,313,440 by Gunter Gleim, Friedrich Fuldner and Bernal Rekla and titled "Counter", which application is a continuation of PCT application PCT/EP 90//01599, filed Sep. 20, 1990

The invention is directed to a detection circuit for a track regulation circuit which guides a detection device along a recording meduim. In the preferred embodiment the detection device is a light beam generated by an optical scanner which is tracked along the data tracks of a recording medium. The light beam reading the data generates an HF signal and a tracking error signal TE, the envelope of the HF signal is checked to determine whether the envelope drops below a first predetermined threshold value. CD players, video disk players, DRAW disk players or magneto-optical recording and playback apparatus, for example, are equipped with a track regulation circuit and an optical scanning device.

The construction and function of an optical scanning device, a so-called optical pick-up, are described in Electronic Components & Applications. Vol. 6. No. 4, 1984, on pages 209 through 215. Lenses focus a light beam emitted from a laser diode onto a compact disk, which reflects the beam onto a photodetector. The information stored on the disk, and the actual values for the focusing and tracking circuits are obtained from the signal reflected from the detector. The referenced article calls the deviation of the focusing-circuit actual value from its reference value the focusing error, and the deviation of the tracking-circuit actual value from its reference value the radial tracking error.

The focusing circuit is adjusted with a coil having an object lens which moves along an optical axis through the magnetic field of the coil. The focusing circuit moves the lens back and forth to maintain the light beam from the laser diode focused on the compact disk. The tracking circuit, which is often called the radial drive mechanism, moves the optical pickup radially over the disc. The radial-drive mechanism in some equipment includes a coarse-driven mechanism and a fine-drive mechanism. The coarse-drive mechanism can include a spindle that shifts the overall optical pickup, consisting of a laser diode, lenses, a prismatic beam splitter, and a photodetector, back and forth radially. The fine-drive mechanism can either shift the beam of light back and forth radially or tilt it at a prescribed angle, advancing it slightly, approximately 1 mm, along a radius of the disc.

High quality reproduction, irrespective of whether the data are both picture and sound in a videodisc player, sound alone in a compact-disc player, or the data stored on a magneto-optical disc, requires precise focusing of the light beam onto the disc and also precise guidance along the data tracks of the disc.

FIGS. 1 to 4 are useful in understanding how the track of a laser scanned disc is followed. In FIG. 1, three laser beams L1, L2, and L3 are focused onto a photodetector PD in the optical pickup of a compact-disk player, the direction of motion of detector PO relative to the disc is indicated by the arrow. Beams L2 and L3 are diffraction beams of orders $+1$ and $-1$. A pickup of this type is called a three-beam pickup. The photodetector PD includes four square photodiodes A, B, C and D arrayed in the form of a larger square. A rectangular photodiode E is arranged in front of the diodes A to D and another photodiode F is arranged behind the photodiodes A to D. The middle laser beam, beam L1, is focused onto photodiodes A, B, C, and D, to generate data signal $HF = AS+BS+CS+DS$ and a focusing-error signal $FE=(AS+CS)-BS+DS)$. The forward outer beam L3 is reflected to photodiode E and rear outer beam L2, is reflected to photodiode F. The two outer beams L2 and L3 provide signals for the generation of a tracking-error signal $TE=ES-FS$. The parameters AS, BS, CS, DS, ES, and FS are the photoelectric voltages provided by the photodiodes A, B, C, D, E, and F, respectively.

When the middle laser beam L1 is precisely at the middle of a track the tracking-error signal TE has the value zero:

$$TE=ES-FS$$

When the middle beam moves away from the middle of the track S, one of the diffraction beams approaches the middle of the track and the other diffraction beam shines on the space between two tracks. Since, however, a track reflects differently from the space between the two tracks, one diffraction beam will be reflected more powerfully than the other.

Laser beams L1, L2, and L3 are displaced to the right of track S in FIG. 2, and the tracking-error signal assumes a negative value:

$$TE=ES-FS<0.$$

The mechanism that adjusts the tracking circuit shifts the optical pickup to the left until tracking-error signal TE becomes zero.

In the opposite situation, when the laser beams have been displaced to the left of the track, the tracking-error signal becomes positive:

$$TE=ES-FS>0.$$

The mechanism that adjusts the tracking circuit shifts the optical pickup to the right until the tracking-error signal becomes zero. This situation is illustrated in FIG. 3.

When middle beam L1 and its associated diffraction beams L2 and L3 cross several data tracks, tracking-error signal TE assumes the sinusoidal shape illustrated in FIG. 4.

A tracking circuit is described in Japanese Exposure 60 10429. In this tracking circuit, the lower and upper envelope of the HF signal indicates whether a beam of light is crossing any data tracks. When the beam travels over several tracks, the HF signal collapses uniformly between two tracks. The number of racks crossed by the beam of light is determined by constructing, he envelope of the HF signal and converting the envelope into a square-wave signal that is supplied to the counting input terminal of an up-and-down counting circuit, which counts the HF breakdowns.

Direction determining logic is used to determine the direction of the radial motion of the light beam across the recording medium. This logic evaluates the phase shift between the tracking error signal TE and the envelope of the HF signal.

Patent GB-A 2 073 543 describes a tracking regulation circuit which checks whether the HF signal lies below a predetermined threshold value. When it does, dependent upon the sign of the preceding tracking error signal, either a positive or a negative voltage is applied to the control unit of the optical scanner to guide the scanner onto the right data track. However, because dust, dirt, fingerprints or scratches on a CD disk can also cause a collapse of the HF signal, measures must be taken to distinguish between HF collapses caused by such conditions of the recording medium from HF collapses caused by tracking changes of the light beam.

Patent EP-A 0 183 303 describes a CD player in which the lock-in of the light spot onto a data track of the compact disk, the so-called locking-in, occurs at the point of the largest eccentricity of the disk because at this point the relative speed between the light beam and the data track is the lowest. In order to determine the number of tracks crossed by tile light beam the envelope of the HF signal is generated and compared with a threshold value. The comparison of the envelope of the HF signal with the first threshold value provides a pulse shaped signal. Each pulse of this pulse shaped signal indicates a change of track. In order to render the CD player more secure against so-called drop-outs—i.e. audible interference in sound reproduction due to a defective, scratched or dirty compact disk—the envelope of the HF signal can be compared with a second threshold value. A pulse is generated from the envelope of the HF signal only when the envelope exceeds both the first and the second threshold value and when the drop-out detector of the CD player is not in operation. Patent WO-A-88/09988, describes a CD player with a drop-out detector which evaluates the HF signal.

The invention is directed to a detection circuit in which dirt or scratches on the recording medium can not mimic a change of track of the scanning light beam. The invention achieves this goal by the provision of a detection circuit which generates an output signal to indicate that the scanning light beam has left the track, only when the envelope of the HF signal lies below a first predetermined threshold value and when the tracking error signal simultaneously lies above a second predetermined threshold value.

The invention is based upon the fact that the level of the HF signal decreases when dirty or faulty conditions of the recording medium are scanned, but the tracking error signal is not materially changed by such conditions. Therefore, when the HF signal decreases and the tracking error signal remains virtually unchanged, it can be assumed that the HF decrease was caused by undesirable record conditions and not by a tracking change of the light beam.

Figure 1:
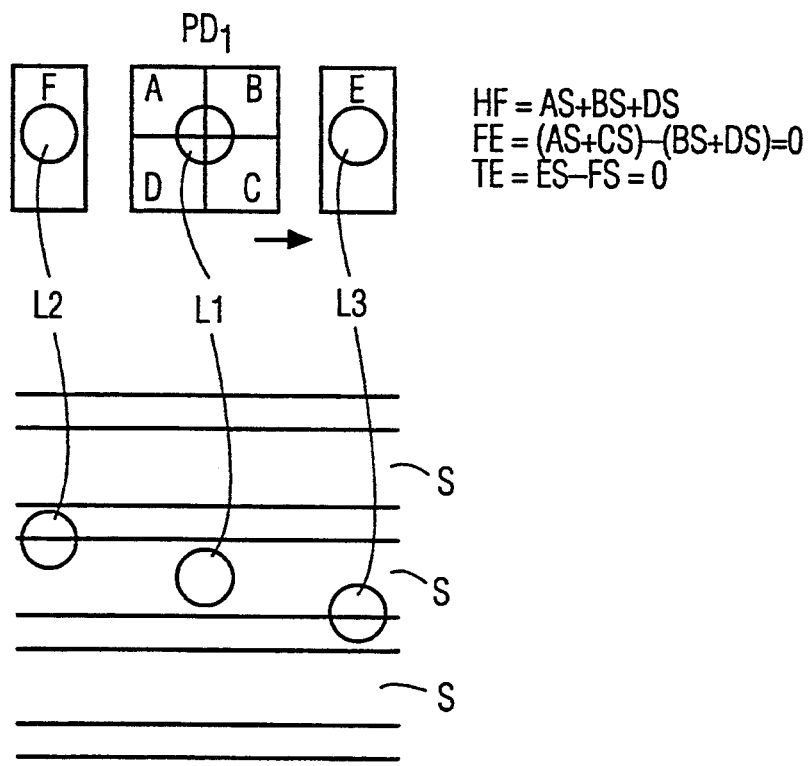
FIGS. 1 to 4 show how a laser beam tracks a record groove.
Figure 2:
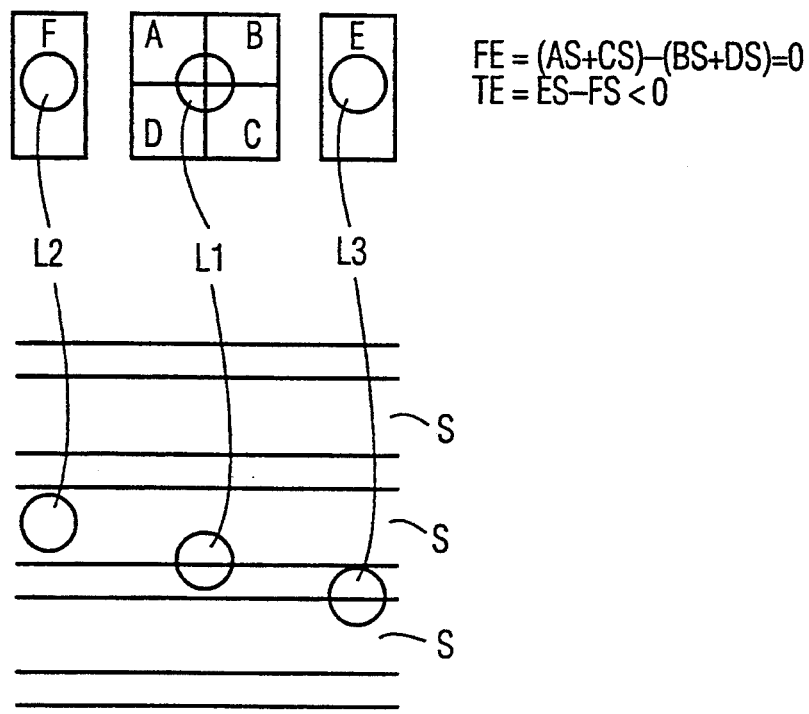
Figure 3:
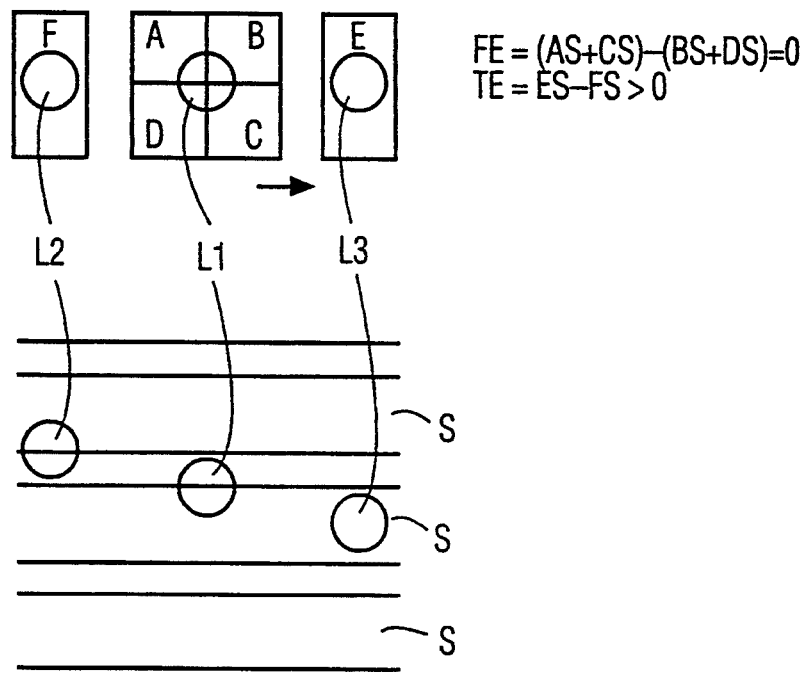
Figure 4:
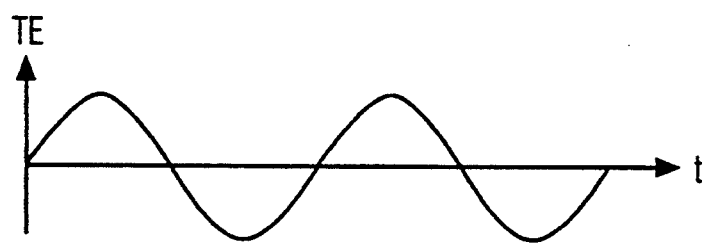
Figure 5:
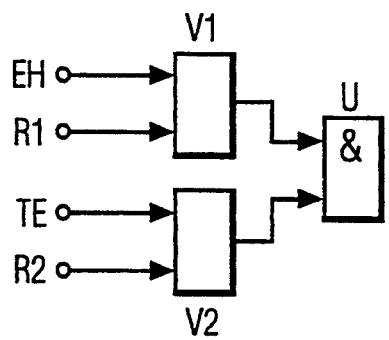
FIG. 5 is a preferred embodiment.

In FIG. 5, the envelope EH of signal HF is applied to one input terminal of a comparator V1, which receives a first reference voltage R1 at its other input terminal. The output terminal of comparator V1 is normally low and goes high when the HF signal drops below reference voltage R1. A sinusodial tracking-error signal is applied to one input terminal of another comparator V2, the other input terminal of which receives a second reference voltage R2. The output terminal of comparator V2 is high when tracking error signal TE exceeds reference voltage R2. The output terminals of comparators V1 and V2 are connected to the input terminals of an AND gate U which provides a logic ONE output when signal HF drops below reference voltage R1 and the tracking-error signal TE is simultaneously above reference voltage R2.

Figure 6:
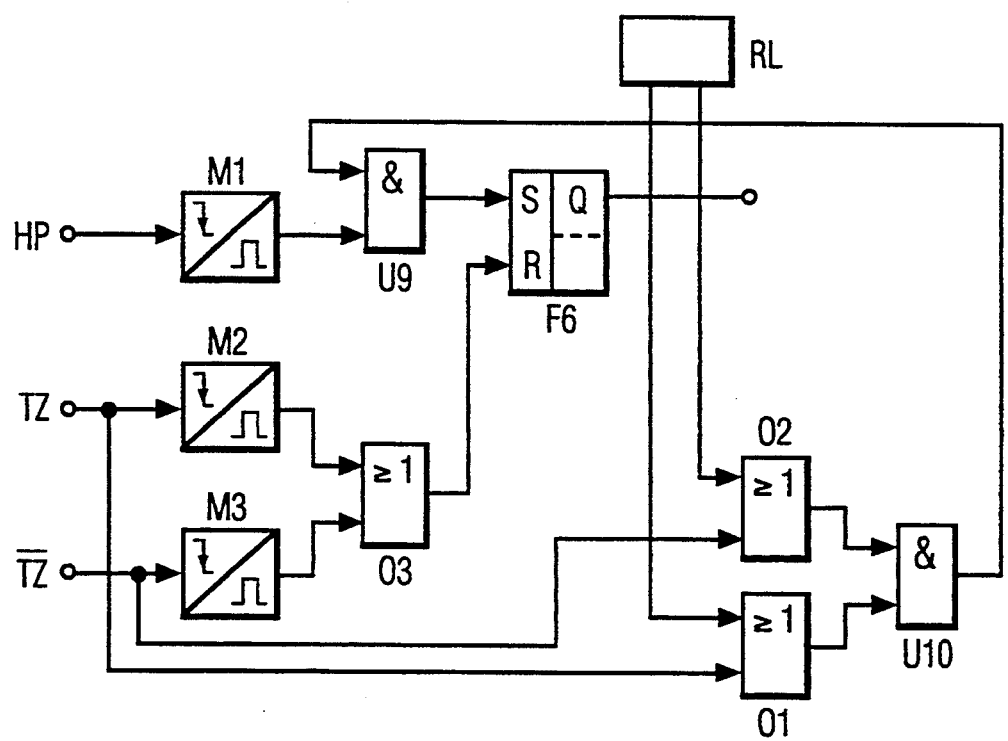
FIG. 6 is another preferred embodiment.

In FIG. 6, a pulsed envelope signal HP, which is derived from envelope EH, is applied to the input terminal of a monoflop M1 that is triggered by a falling pulse edge. A pulsed tracking-error signal TZ, derived from sinusoidal tracking-error signal TE, is applied to one input terminal of an OR gate 01 and to another monoflop M2, which is also triggered by a falling pulse edge. An inverted pulsed tracking-error signal $\overline{TZ}$, is applied to one input terminal of another OR gate 02 and to a monoflop M3, which is triggered by a rising pulse edge. The output terminal of monoflops M2 and M3 are connected to the input terminals of an OR gate 03, the output terminal of which is connected to the reset input terminal of an RS flip-flop F6. The output terminal of monoflop M1 is connected to the first input terminal of an AND gate U9, the output terminal of which is connected to the set input terminal of RS flip-flop F6. A directional logic circuit RL provides a logic ONE on one or the other of its output terminals, depending upon the direction the light beam is traveling. One output terminal of logic circuit RL in is connected to the second input terminal of OR gate 01, and the other output terminal of logic circuit RL is connected to the second input terminal of OR gate 02. The RL circuit is described in detail in application S/N (RCA 86,784) fully referenced herinabove. The output terminals of OR gates 01 and 02 are connected to the input terminals of an AND gate U10, the output terminal of which is connected to the second input terminal of AND gate U9. RS flip-flop F6 is set when the light beam shines on the land between two tracks and is reset when the beam shines on a track.

Monoflop M1 provides a logic ONE for every falling edge of the pulsed envelope signal HP. Since signal HP is derived from the HF-signal envelope, a falling edge occurs in the pulsed envelope signal, when the signal drops below the prescribed threshold. When the light beam moves in one direction, AND gate U10 emits a logic ONE for each positive pulse of the pulsed tracking-error signal TZ. RS flip flop F6 is set only when monoflop M1 is set and the pulsed tracking-error signal TZ, simultaneously exhibits a positive pulse. When the beam moves in the other direction, AND gate U10 emits a logic ONE for each positive pulse of the inverted pulsed tracking-error signal $\overline{TZ}$. RS flip-flop F6 is set when monoflop M1 is set and inverted pulsed tracking-error signal $\overline{TZ}$ simultaneously exhibits a positive pulse. A falling edge of the pulsed tracking-error signal TZ or a rising edge of the inverted pulsed tracking-error signal $\overline{TZ}$, resets RS flip-flop F6.

Figure 7:
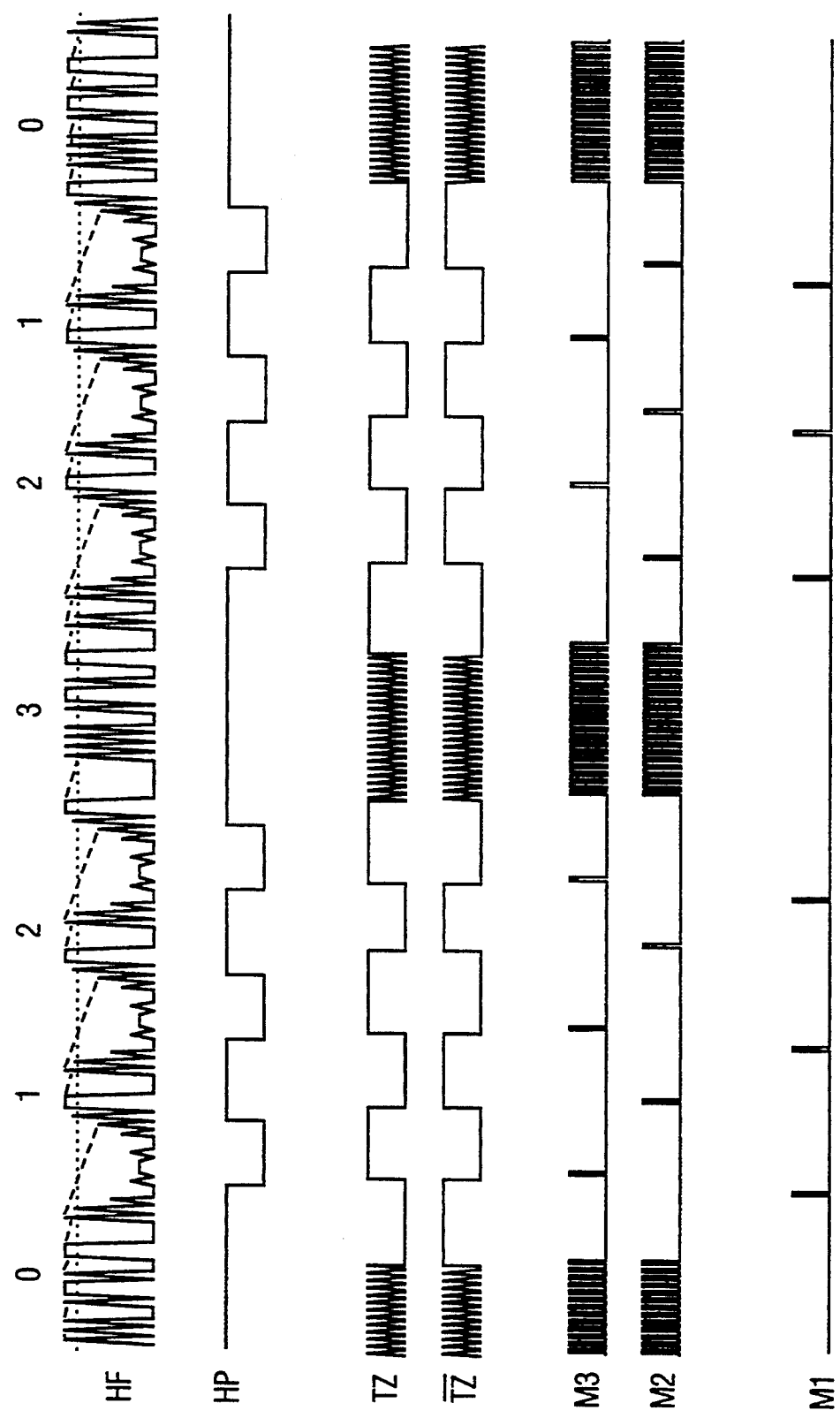
FIGS. 7 and 8 are pulse diagrams for the preferred embodiment of FIG. 6.
Figure 8:
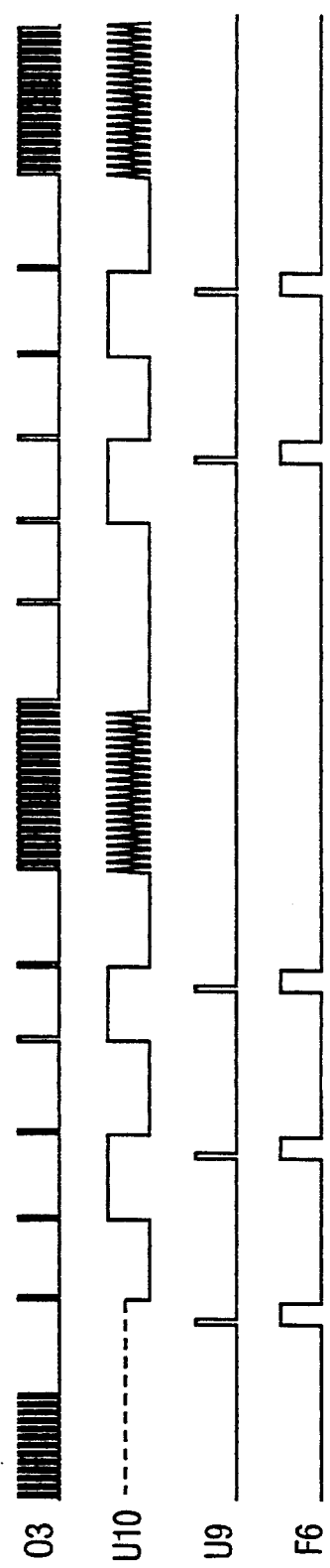

FIGS. 7 and 8 show the signal HF, the pulsed envelope signal HP derived from the HF signal, the pulsed tracking-error signal TZ the inverted pulsed tracking-error signal $\overline{TZ}$ the output signals from monoflops M1, M2, and M3, the signal at the output terminals of AND gates U9 and U10, and the signals at the output terminals of OR gate 03 and RS flip-flop F6.

The invention is generally useful with counting circuits which count indications and with control circuits which position a component, a pickup for example, whereby the positioning is conducted by sensing the indications. It is immaterial whether the sensing is remote or mechanical. The invention is especially useful with tracking circuits of the type used in compact-disk players, videodisk players, DRAW-disk players, and magneto-optical equipment for example.

We claim:

1. In apparatus for recovering data from a recorded medium in which data is retrieved by a track following detection device, which apparatus includes means for providing a recovered data signal HF, a tracking error signal TE, and a bilevel direction signal RL indicating a direction transverse to said track that said detection device may be following, said apparatus including a regulation circuit which guides said detection device along the data tracks of the recorded medium, regulating circuitry control signal generating apparatus comprising:

means responsive to said signal HF for providing a first pulsed signal with respective pulses occurring at transitions of one polarity of a bilevel version of said signal HF;

means responsive to said signal TE for providing a second pulsed signal with pulses occurring at transitions of both polarities of a bilevel version of said signal TE;

means responsive to said bilevel version of said signal TE and said bilevel direction signal RL, for producing a signal U10 having a first state when said bilevel version of said signal TE and said bilevel direction signal RL both exhibit a like state, and having a second state otherwise;

a flipflop arranged to be reset by said second pulsed signal, and set by a further signal, said flipflop providing said regulating circuitry control signal; and an AND circuit arranged for ANDing said first pulsed signal and said signal U10 to generate said further signal.

* * * * *

UNITED STATES PATENT AND TRADEMARK OFFICE
CERTIFICATE OF CORRECTION

PATENT NO. : 5,375,107

DATED : December 20, 1994

INVENTOR(S) : Gunter Gleim et al.

It is certified that error appears in the above-identified patent and that said Letters Patent is hereby corrected as shown below:

Cover page insert item [30]:

-- Foreign Application Priority Data
   Sept. 30, 1989 [DE] Germany.......3932831.7
   Sept. 20, 1990 [PCT/EP].............90/01595--

Signed and Sealed this

Twelfth Day of September, 1995

Attest:

BRUCE LEHMAN

Attesting Officer

Commissioner of Patents and Trademarks